(12) United States Patent
Kayahara

(10) Patent No.: US 7,519,031 B2
(45) Date of Patent: Apr. 14, 2009

(54) SYSTEM AND METHODS OF DIFFERENTIAL COMMUNICATION

(75) Inventor: Naoki Kayahara, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 1575 days.

(21) Appl. No.: 10/314,220

(22) Filed: Dec. 9, 2002

(65) Prior Publication Data

US 2003/0108021 A1  Jun. 12, 2003

(30) Foreign Application Priority Data

Dec. 10, 2001 (JP) ............................. 2001-376126

(51) Int. Cl.
*H04Q 7/24* (2006.01)

(52) U.S. Cl. ..................... 370/338; 370/335; 370/441; 370/445; 370/498; 370/480; 705/23; 705/43; 709/218

(58) Field of Classification Search ................. 370/338, 370/335, 441, 445, 486, 487, 480, 498; 709/218
See application file for complete search history.

(56) References Cited

U.S. PATENT DOCUMENTS

| | | | |
|---|---|---|---|
| 4,965,793 A * | 10/1990 | Polzin et al. ................. | 370/236 |
| 5,859,971 A | 1/1999 | Bittinger et al. | |
| 6,910,073 B2 * | 6/2005 | Banga et al. ................. | 709/225 |
| 6,941,351 B2 * | 9/2005 | Vetrivelkumaran et al. .. | 709/217 |
| 7,092,997 B1 * | 8/2006 | Kasriel et al. ................ | 709/213 |
| 7,185,063 B1 * | 2/2007 | Kasriel et al. ................ | 709/216 |
| 7,188,214 B1 * | 3/2007 | Kasriel et al. ................ | 711/118 |
| 7,194,743 B2 * | 3/2007 | Hayton et al. ................ | 719/315 |
| 7,266,526 B1 * | 9/2007 | Drummond et al. ........... | 705/43 |
| 7,269,784 B1 * | 9/2007 | Kasriel et al. ............... | 715/205 |
| 7,302,469 B2 * | 11/2007 | Motoyama et al. .......... | 709/206 |
| 7,305,381 B1 * | 12/2007 | Poppink et al. ................ | 707/3 |
| 7,318,086 B2 * | 1/2008 | Chang et al. ................. | 709/217 |
| 7,343,407 B2 * | 3/2008 | Motoyama et al. .......... | 709/224 |

FOREIGN PATENT DOCUMENTS

| | | |
|---|---|---|
| CN | 1184575 A | 6/1998 |
| JP | A 03-210855 | 9/1991 |
| JP | 07-175662 | 7/1995 |
| JP | A 10-003418 | 1/1998 |
| JP | A 11-120487 | 4/1999 |
| JP | 11-265309 | 9/1999 |
| JP | 2000-048106 | 2/2000 |
| JP | A 2000-132466 | 5/2000 |
| JP | A 2000-299698 | 10/2000 |
| JP | A 2002-158673 | 5/2002 |

* cited by examiner

*Primary Examiner*—Marceau Milord
(74) *Attorney, Agent, or Firm*—Oliff & Berridge, PLC

(57) ABSTRACT

[Object] To provide a differential communication system that is preferable for performing differential communication in a dynamically configured network.

[Solving Means] Portable terminals 100 to 120 each generates difference information from information to be transmitted, based on reference information held by itself, and transmits the generated difference information to an intended portable terminal. Also, upon receiving difference information, each of the portable terminals 100 to 120 determines whether or not reference information held by a transmission source of the difference information and reference information held by itself are the same. Upon determining that they are not the same, each of the portable terminals 100 to 120 obtains the reference information held by the transmission source of the difference information, and, based on the obtained reference information, restores, from the received difference information, information to be transmitted.

18 Claims, 7 Drawing Sheets

[FIG. 1]
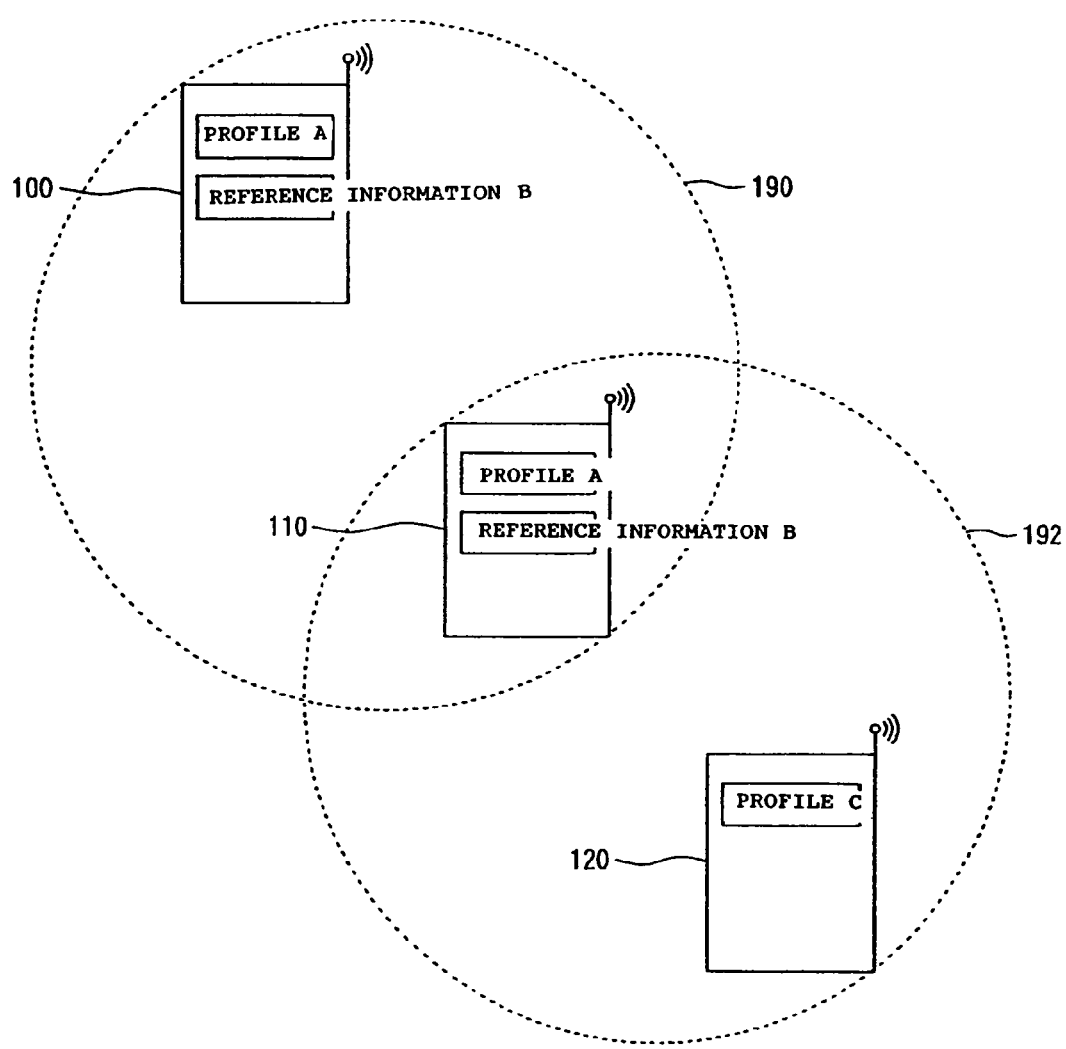

[FIG. 2]
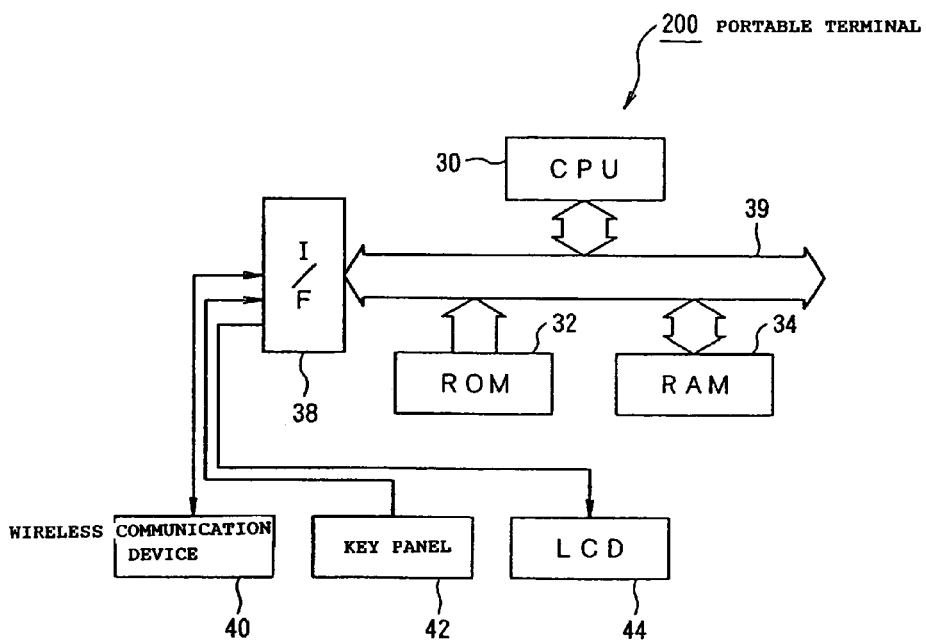
[FIG. 3]

[FIG. 4]

PROFILE A

```
<userprofile>
     <id> 0001 </id>
     <name> A </name>
     <age> 30 </age>
     <job>  TEACHER </job>
     <address> SUWA </address>
</userprofile>
```

PROFILE B

| ID (330) | NAME (332) | AGE (334) | OCCUPATION (336) | ADDRESS (338) |
|---|---|---|---|---|
| 0002 | B | 35 | DOCTOR | MATSUMOTO |

(b)

REFERENCE INFORMATION B

| ID (340) | NAME (342) | AGE (344) | OCCUPATION (346) | ADDRESS (348) | REFERENCE INFORMATION ID (350) |
|---|---|---|---|---|---|
| 0098 | Y | 35 | TEACHER | MATSUMOTO | 0002 |

[FIG. 6]
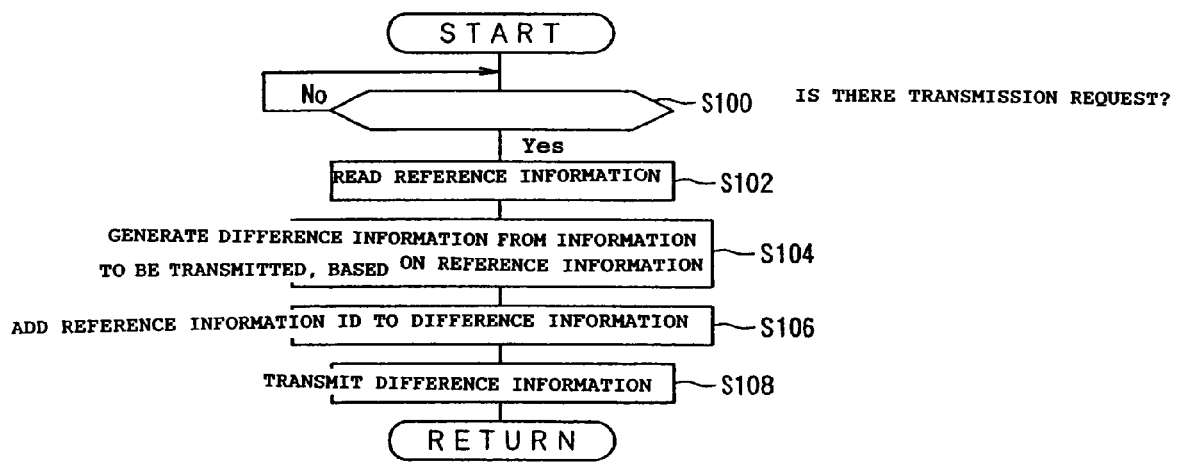
[FIG. 7]

[FIG. 8]
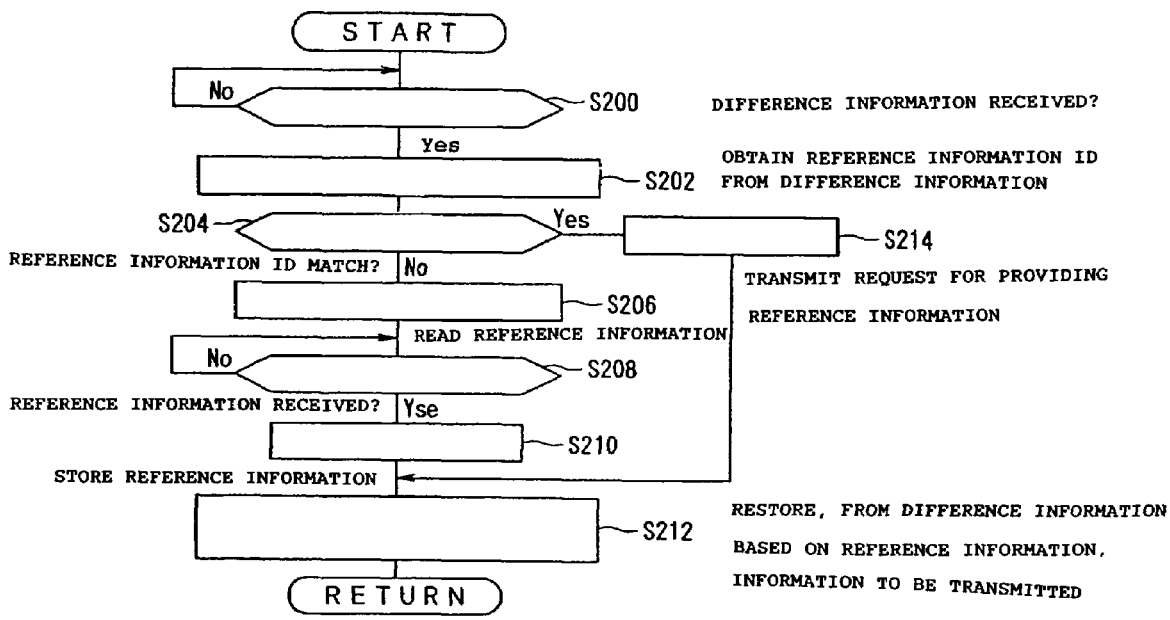
[FIG. 9]
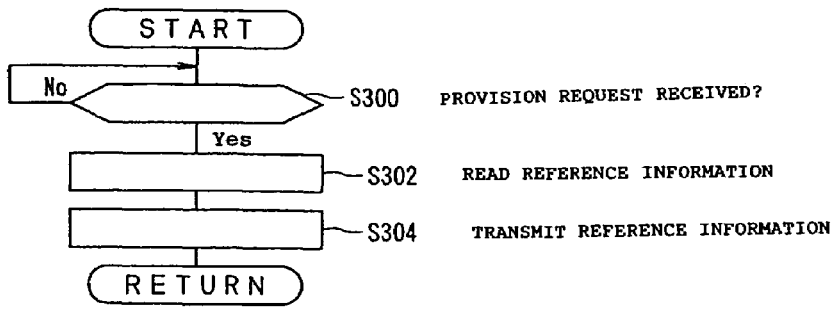

| ID | NAME | AGE | OCCUPATION | REFERENCE INFORMATION ID |
|---|---|---|---|---|
| * | * | +5 | * | 0001 |

(b)

| ID | NAME | OCCUPATION | ADDRESS | REFERENCE INFORMATION ID |
|---|---|---|---|---|
| * | * | * | SUWA | 0002 |

(c)

| ID | NAME | OCCUPATION | ADDRESS | REFERENCE INFORMATION ID |
|---|---|---|---|---|
| 0003 | C | LAWYER | SUWA | 0002 |

(d)

| ID | NAME | AGE | REFERENCE INFORMATION ID |
|---|---|---|---|
| 0003 | C | +5 | 0001 |

[FIG. 11]

```
<userprofile>
        <id> * <id>
        <name> * </name>
        <age> +5 </age>
        <job> * </job>
</userprofile>
 0001
```

[FIG. 12]
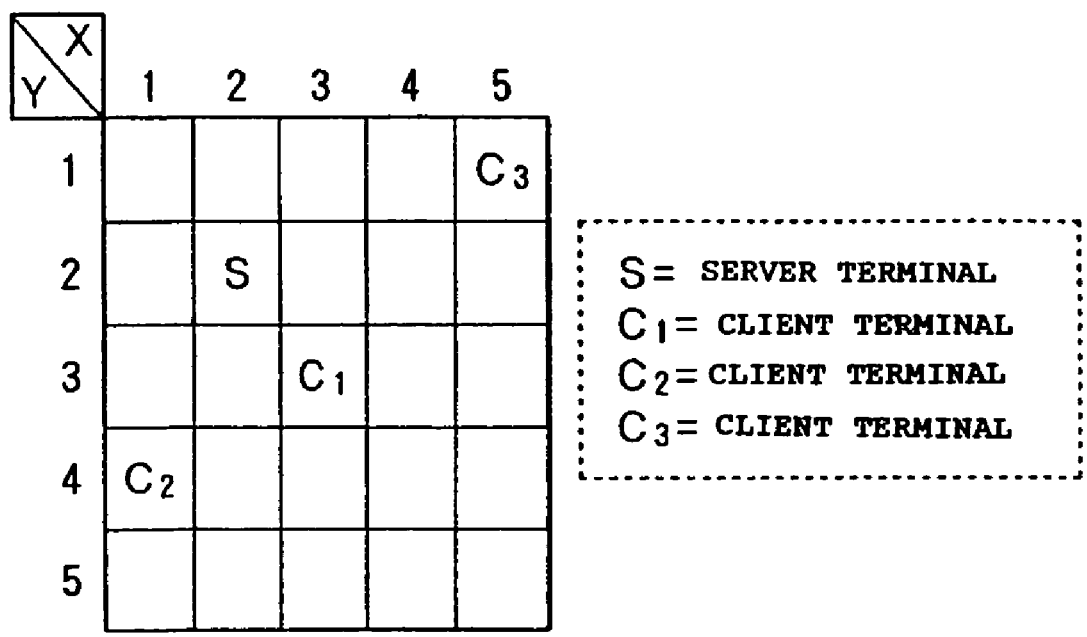

SYSTEM AND METHODS OF DIFFERENTIAL COMMUNICATION

BACKGROUND OF THE INVENTION

1. Field of Invention

The present invention relates to systems, devices, programs, and methods for performing differential communication, and more particularly to a differential communication system, a differential communication device, a differential communication program, and a differential communication method, which are preferable for performing differential communication in a dynamically configured network.

2. Description of Related Art

During communication between a transmitting device and a receiving device, what is called "differential communication" can be used to reduce the amount of communication and to improve confidentiality. In this differential communication, the transmission device and the receiving device hold common reference information in communication therebetween, such that the transmission device transmits difference information, which is a difference between plain information and the reference information, to the receiving device, which in turn restores the original plain information from the received difference information and the reference information.

Conventionally, for example, available technologies for differential communication include a remote maintenance system (hereinafter referred to as a "first conventional example") disclosed in Japanese Unexamined Patent Application Publication No. H7-175662, a partial-extraction-type remote maintenance system (hereinafter referred to as a "second conventional example") disclosed in Japanese Unexamined Patent Application publication No. H11-265309, and a financial transaction processing system (hereinafter referred to as a "third conventional example") disclosed in Japanese Unexamined Patent Application Publication No. 2000-048106.

In the first conventional example, a host computer and a remote computer are connected over a network. At the host computer, first, a change-history generating section generates a change history for an old source program in a storage device, the old source program being designated by a remote computer. A modification-program storage section stores a change history containing modified-line information. An edit-information generating section generates edited information for each communication. A transmitting section transmits the edited information for each communication to the remote computer. At the remote computer, first, a receiving section receives the edited information for each communication and composes a change history for an old source program in a storage device. A program updating section generates a new source program from the change history and the old source program. A compiling section compiles the new source program to generate a new execution-format program.

This arrangement can minimize the amount of data transmitted, and can facilitate a program update for a remote computer without affecting the system operation.

In the second conventional example, a host computer and a remote computer are connected over a network. The host computer includes a difference-information extracting section, a verification-code generating section, and a distributing section. When data stored in the host computer is changed, the difference-information extracting section compares the contents of the data before it is changed and the contents thereof after it is changed, to extract difference information therefor. The verification-code generating section generates a verification code concerning the changed contents. The distributing section distributes change information, which contains the difference information, and the verification code to the remote computer. The remote computer updates the contents of data stored in its own terminal, in accordance with the change information, and generates a verification code from the updated contents. The remote computer also includes a verification-code checking section for checking the generated verification code against a verification code that is transmitted from the host computer.

Thus, upon update of data at the host computer, the amount of data transmitted for updating data in the remote computer can be reduced and the contents of the updated data can be verified at the remote computer.

In the third conventional example, a payment server and a client are connected over a network. The client transmits the date and time of update of a financial-organization-name table and the date and time of update of a branch-name table to the payment server. In response to the transmitted contents, the payment server transmits difference data to the client, which, in turn, uses the difference data to update the financial-organization-name table and the branch-name table and also transmits the updated contents to the payment server.

Thus, in bank transaction utilizing a network, all the names of financial organizations and branches with which transaction is possible can be selected at the time of a transaction, and transaction-processing time can be reduced by minimizing the amount of data communicated during a transaction.

SUMMARY OF THE INVENTION

[Problems to be Solved by the Invention]

As described above, in the first to third conventional examples, since a transmitting device and a receiving device are connected over a network, differential communication can be performed on the premise that the transmitting device and the receiving device hold common reference information. However, in other words, differential communication cannot be performed when the transmitting device and the receiving device have no common reference information.

For example, as with Bluetooth, when communication devices within a given range dynamically configure a network to communicate with each other, a reduction in the amount of communication and an improvement in confidentiality are critical issues since wireless communication is mainly used. Thus, while differential communication is hopefully exploited, it is extremely difficult to perform differential communication in a dynamically configured network since the transmission device and the receiving device have no common reference information.

Accordingly, the present invention is made by paying attention to the unsolved issues of such conventional art, and an object of the present invention is to provide a differential communication system, a differential communication device, a differential communication program, and a differential communication method, which are preferable for performing differential communication in a dynamically configured network.

[Means for Solving the Problems]

To achieve the foregoing object, according to a first aspect of the present invention, there is provided a differential communication system in which a first communication device and a second communication device are connected to be able to communicate with each other and perform differential communication therebetween. Reference information in one or both of the first communication device and the second communication device is changed so that reference information used by the first communication device and reference information used by the second communication device become the same during differential communication. Using difference information generated based on the reference information, the first communication device and the second communication device perform differential communication therebetween.

With this arrangement, when the first communication device and the second communication device are connected to be able to communicate with each other, reference information of one or both of the first communication device and the second communication device is changed so that reference information used by the first communication and reference information used by the second communication device become the same during differential communication, and, the first communication device and the second communication device perform differential communication therebetween using difference information generated based on the reference information.

Herein, reference information used by the first communication device includes information held by the first communication device and, for example, information held by another communication device that is connected with the first communication device to be able to communicate therewith. Thus, reference information does not need to be held by the first communication device as long as the information can be used by the first communication device. This also holds true for reference information used by the second communication device. Further, this description is also true for a differential communication device according to a twelfth aspect described below.

The change in reference information may be performed before differential communication, or may be performed after differential communication. In the former case, since differential communication is performed after reference information is changed, when difference information is received at a receiving side, original information is restored from the difference information, based on reference information used at the receiving side. In the latter case, since reference information is changed after performing differential communication, when difference information is received at a receiving side, original information is restored, after change of reference information, from the difference information, based on reference information used at the receiving side. This description is also true for a differential communication method according to a twelfth aspect of the present invention.

This system may be realized with only the first and second communication devices or may be realized as a network system in which a plurality of communication devices is connected to be able to communicate with each other. In the latter case, each element may belong to any communication device of the plurality of communication devices, as long as the elements are connected to be able to communicate with each other.

In addition, according to a second aspect of the present invention, there is provided a differential communication system in which a transmitting device and a receiving device are connected to be able to communicate with each other and perform differential communication therebetween. The differential communication system includes match determining means for determining whether or not reference information used by the transmitting device and reference information used by the receiving device are the same during differential communication; and reference-information changing means for changing, based on a result determined by the match determining means, reference information in one or both of the transmitting device and the receiving device so that the reference information used by the transmitting device and reference information used by the receiving device become the same. The transmitting device includes difference-information generating means for generating, based on the reference information used by the transmitting device, difference information from information to be transmitted; and transmitting means for transmitting the difference information generated by the difference-information generating means to the receiving device. The receiving device includes receiving means for receiving the difference information from the transmitting device; and information restoring means for restoring, from the difference information received by the receiving means, information to be transmitted, based on the reference information used by the receiving device.

With this arrangement, when the transmitting device and the receiving device are connected to be able to communicate with each, the match determining means determines whether or not reference information used by the transmitting device and reference information used by the receiving device are the same during differential communication. Based on a result determined by the match determining means, the reference-information changing means changes reference information in one or both of the transmitting device and the receiving device so that the reference information used by the transmitting device and the reference information used by the receiving device become the same.

Meanwhile, at the transmitting device, the difference-information generating means generates difference information from information to be transmitted, based on reference information used by the transmitting device, and the transmitting means transmits the generated difference information to the receiving device.

At the receiving device, when the receiving means receives the difference information from the transmitting device, the information restoring means restores, from the received difference information, the information to be transmitted, based on the reference information used by the receiving device.

In this case, the match determining means or the reference-information changing means may be provided in the transmitting device or the receiving device. The following four configurations are available as a configuration in which the match determining means or the reference-information changing means is provided in the transmitting device or the receiving device.

A first configuration is to provide the match determining means and the reference-information changing means in the transmitting device. In this case, for example, the match determining means makes a determination by communicating with the receiving device, and the reference-information changing means makes a change by obtaining reference information used by the receiving device or information the same as the reference information or by providing the receiving device with reference information used by the transmitting device.

A second configuration is to provide the match determining means and the reference-information changing means in the receiving device. In this case, for example, the match determining means makes a determination by communicating with the transmitting device, and the reference-information changing means makes a change by obtaining reference information used by the transmitting device or information the same as the reference information or by providing the transmitting device with reference information used by the receiving device.

A third configuration is to provide the match determining means in the transmitting device and to provide the reference-information changing means in the receiving device. In this case, for example, the match determining means makes a determination by communicating with the receiving device, and the reference-information changing means makes a change by obtaining, in response to a notification about a determination result from the transmitting device, reference information used by the transmitting device or information the same as the reference information or by providing the transmitting device with reference information used by the receiving device.

A fourth configuration is to provide the match determining means in the receiving device and to provide the reference-information changing means in the transmitting device. In this case, for example, the match determining means makes a determination by communicating with the transmitting device, and the reference-information changing means makes a change by obtaining, in response to a notification about a determination result from the receiving device, reference information used by the receiving device or information the same as the reference information or by providing the receiving device with reference information used by the transmitting device.

Examples of reference information used by the transmitting device include reference information held by another communication device that is connected with the transmitting device to be able to communicate therewith, as well as reference information held by the transmitting device. Thus, the reference information does not need to be held by the transmitting device, as long as the information can be used by the transmitting device. This also holds true for reference information used by the receiving device. Further, this description is also true for a differential communication device according to one of eighth to thirteenth aspects of the present invention and a differential communication program according to one of fourteen to nineteenth aspects of the present invention.

Also, the reference-information changing means may change reference information before differential communication or after differential communication. In the former case, since differential communication is performed after reference information is changed, at the receiving device, when difference information is received, original information is restored from the difference information, based on reference information used by the receiving device. In the latter case, since reference information is changed after differential communication is performed, when difference information is received at the receiving device, original information is restored, after change of reference information, from the difference information, based on reference information used by the receiving device. This is also true for a differential communication device according to one of eighth to thirteenth aspects and a differential communication program according to fourteenth to nineteenth aspects of the present invention.

This system may be realized with only the transmitting and receiving devices or may also be realized as a network system in which a plurality of communication devices is connected to be able to communicate with each other. In the latter case, each element may belong to any communication device of the plurality of the communication devices as long as the elements are connected to be able to communicate with each other.

Additionally, according to a third aspect of the present invention, in a differential communication system of the second aspect, the receiving device includes match determining means for determining whether or not the reference information used by the receiving device and the reference information used by the transmitting device are the same; and reference-information obtaining means for obtaining, when the match determining means determines that they are not the same, the reference information used by the transmitting device or information the same as the reference information. Based on the reference information obtained by the reference-information obtaining means, the information-restoring means restores, from the difference information received by the receiving means, the information to be transmitted.

With this arrangement, at the transmitting device, the difference-information generating means generates difference information from information to be transmitted, based on reference information used by the transmitting device, and the transmitting means transmits the generated difference information to the receiving device.

At the receiving device, when the receiving means receives the difference information from the transmitting device, the match determining means determines whether or not reference information used by the receiving device and the reference information used by the transmitting device are the same. As a result, when it is determined that both pieces of the reference information are not the same, the reference-information obtaining means obtains reference information used by the transmitting device or information the same as the reference information, and the information restoring means restores, from the received difference information, information to be transmitted, based on the obtained reference information.

In this case, the reference-information obtaining means may be adapted to obtain the reference information used by the transmitting device or to obtain information the same as the reference information used by the transmitting device. In the former case, for example, the reference information can be obtained from the transmitting device. In the latter case, for example, the reference information can be obtained from another communication device or the like that is connected with the transmitting device to be able to communicate therewith and that provides reference information used by the transmitting device. This is also true for a differential communication device according to ninth to tenth aspects of the present invention.

Also, the reference-information obtaining means may be adapted to obtain reference information before difference information is received or after difference information is received. This description is also true for a differential communication device according to ninth to tenth aspects of the present invention.

In addition, according to a fourth aspect of the present invention, in a differential communication system of the third aspect of the present invention, the difference-information generating means attaches reference information ID for identifying the reference information used by the transmitting device to the difference information. The match determining means obtains the reference information ID from the difference information received by the receiving means and determines whether or not the reference information identified with the obtained reference information ID and the reference information used by the receiving means are the same.

With this arrangement, at the transmitting device, the difference-information generating means attaches, to difference information, reference information ID for identifying reference information used by the transmitting device, and the transmitting means transmits the generated difference information to the receiving device.

At the receiving device, when the receiving means receives the difference information from the transmitting device, the match determining means obtains the reference information ID from the received difference information and determines whether or not reference information identified with the obtained reference information ID and reference information used by the receiving device are the same. As a result, when it is determined that both pieces of the reference information are not the same, the reference-information obtaining means obtains reference information used by the transmitting device or information the same as the reference information, and the information restoring means restores, from the received difference information, information to be transmitted, based on the obtained reference information.

Additionally, according to a fifth aspect of the present invention, in a differential communication system of the second aspect, the transmitting device includes match determining means for determining whether or not the reference information used by the transmitting device and the reference information used by the receiving device are the same; and reference-information obtaining means for obtaining, when the match determining means determines that they are not the same, the reference information used by the transmitting device or information the same as the reference information. Based on the reference information obtained by the reference-information obtaining means, the difference-information generating means generates the difference information from the information to be transmitted.

With this arrangement, at the transmitting device, the match determining means determines whether or not reference information used by the transmitting device and reference information used by the receiving means are the same. As a result, when it is determined that both pieces of the reference information are not the same, the reference-information obtaining means obtains the reference information used by the transmitting device or information the same as the reference information; the difference-information generating means generates, from information to be transmitted, difference information, based on the obtained reference information; and the transmitting means transmits the generated difference information to the receiving device.

At the receiving device, when the receiving means receives the difference information from the transmitting device, the information restoring means restores, from the received difference information, the information to be transmitted, based on the reference information used by the receiving device.

In this case, the reference-information obtaining means may be adapted to obtain the reference information used by the receiving device or to obtain information the same as the reference information used by the receiving device. In the former case, for example, the reference information can be obtained from the receiving device. In the latter case, for example, the reference information can be obtained from another communication device or the like that is connected with the receiving device to be able to communicate therewith and that provides reference information used by the receiving device. This description is also true for a differential communication device according to eleventh to thirteenth aspects.

Furthermore, according to a sixth aspect of the present invention, in a differential communication system of one of the second to fifth aspects, the transmitting device and the receiving device are able to dynamically configure a network. When the transmitting device and the receiving device are allowed by the network to communicate with each other, they perform differential communication over the network.

With this arrangement, the transmitting device and the receiving device dynamically configure the network. When the transmitting device and the receiving device are allowed by the network to be able to communicate with each other, the transmitting device and the receiving device perform differential communication over the network.

In addition, according to a differential communication system of a seventh aspect of the present invention, in a differential communication system of one of the second to sixth aspects, the differential communication system further includes reference-information generating means for generating the reference information so that the amount of data communicated between the transmitting device and the receiving device is reduced during differential communication.

With this arrangement, the reference-information generating means generates reference information so that the amount of data communicated between the transmitting device and the receiving device is reduced during differential communication.

In this case, only the amount of data of difference information may be taken into account as the amount of data communicated between the transmitting device and the receiving device. When reference information is transmitted and received in addition to difference information, the amount of data of difference information and reference information may be taken into account.

Meanwhile, to achieve the foregoing object, according to a differential communication device of an eighth aspect of the present invention, there is provided a differential communication device for performing differential communication with the receiving device in a differential communication system of the third aspect. The differential communication device includes difference-information generating means for generating, based on reference information used by the differential communication device, the difference information from the information to be transmitted; and transmitting means for transmitting the difference information generated by the difference-information generating means to the receiving device.

With this arrangement, when the differential communication device is connected with the receiving device in a differential communication system of the third aspect to be able to communicate therewith, the difference-information generating means generates difference information from information to be transmitted, based on reference information used by the differential communication device, and the transmitting means transmits the generated difference information to the receiving device.

Additionally, according to a differential communication device of a ninth aspect of the present invention, in a differential communication device for performing differential communication with the transmitting device in a differential communication system of the third aspect, the differential communication device includes receiving means for receiving the difference information from the transmitting device and match determining means for determining whether or not reference information used by the differential communication device and the reference information used by the transmitting device are the same. The differential communication device further includes reference-information obtaining means for obtaining, when the match determining means determines that they are not the same, the reference information used by the transmitting device or information the same as the reference information; and information restoring means for restoring, from the difference information received by the receiving means, the information to be transmitted, based on the reference information obtained by the reference-information obtaining means.

With this arrangement, when the differential communication device is connected with the transmitting device in a differential communication system of the third aspect to be able to communicate therewith and the receiving means receives difference information from the transmitting device, the match determining means determines whether or not reference information used by the differential communication device and reference information used by the transmitting device are the same. As a result, when it is determined that both pieces of the reference information are not the same, the reference-information obtaining means obtains the reference information used by the transmitting device or information the same as the reference information, and the information restoring means restores, from the received difference information, information to be transmitted, based on the obtained reference information.

Furthermore, according to a tenth aspect of the present invention, there is provided a differential communication device for performing differential communication with the transmitting device and the receiving device in a differential communication system of the third aspect. The differential communication device includes difference-information generating means for generating, based on reference information used by the differential communication device, the difference information from the information to be transmitted; and transmitting means for transmitting the difference information generated by the difference-information generating means to the receiving device; receiving means for receiving the difference information from the transmitting device. The differential communication device further includes match determining means for determining whether or not the reference information used by the differential communication device and the reference information used by the transmitting device are the same; and reference-information obtaining means for obtaining, when the match-determining means determines that they are not the same, the reference information used by the transmitting device or information the same as the reference information. The differential communication device further includes information restoring means for restoring, from the difference information received by the receiving means, the information to be transmitted, based on the reference information obtained by the reference-information obtaining means.

With this arrangement, when the differential communication device is connected with the receiving device in a differential communication system of the third aspect to be able to communicate therewith, the difference-information generating means generates difference information from information to be transmitted, based on reference information used by the differential communication device, and the transmitting means transmits the generated difference information to the receiving device.

Also, when the differential communication device is connected with the transmitting device in a differential communication system of the third aspect to be able to communicate therewith and the receiving means receives difference information from the transmitting device, the match determining means determines whether or not reference information used by the differential communication device and reference information used by the transmitting device are the same. As a result, when it is determined that both pieces of the reference information are not the same, the reference-information obtaining means obtains the reference information used by the transmitting device or information the same as the reference information, and the information restoring means restores, from the received difference information, information to be transmitted, based on the obtained reference information.

In addition, according to an eleventh aspect of the present invention, there is provided a differential communication device for performing differential communication with the receiving device in a differential communication system of the fifth aspect, The differential communication device includes match determining means for determining whether or not reference information used by the differential communication device and the reference information used by the receiving device are the same; and reference-information obtaining means for obtaining, when the match determining means determines that they are not the same, the reference information used by the receiving device or information the same as the reference information. The differential communication device further includes difference-information generating means for generating, from the information to be transmitted, the difference information, based on the reference information obtained by the reference-information obtaining means; and transmitting means for transmitting the difference information generated by the difference-information generating means to the receiving device.

With this arrangement, when the differential communication device is connected with the receiving device in a differential communication system of the fifth aspect to be able to communicate therewith, the match determining means determines whether or not reference information used by the differential communication device and reference information used by the receiving device are the same. As a result, when it is determined that both pieces of the reference information are not the same, the reference-information obtaining means obtains the reference information used by the receiving device or information the same as the reference information; the difference-information generating means generates, from information to be transmitted, difference information, based on the obtained reference information; and the transmitting means transmits the generated difference information to the receiving device.

According to a twelfth aspect of the present invention, there is provided a differential communication device for performing differential communication with the transmitting device in a differential communication system of the fifth aspect. The differential communication device includes receiving means for receiving the difference information from the transmitting means; and information restoring means for restoring, from the difference information received by the receiving means, the information to be transmitted, based on reference information used by the differential communication device.

With this arrangement, when the differential communication device is connected with the transmitting device in a differential communication system of the fifth aspect to be able to communicate with each other and the receiving means receives difference information from the transmitting device, the information restoring means restores, from the received difference information, information to be transmitted, based on reference information used by the differential communication device.

Additionally, according to a thirteenth aspect of the present invention, there is provided a differential communication device for performing differential communication with the transmitting device and the receiving device in a differential communication system of the fifth aspect. The differential communication device includes match determining means for determining whether or not reference information used by the differential communication device and the reference information used by the receiving device are the same; and reference-information obtaining means for obtaining, when the match-determining means determines that they are not the same, the reference information used by the receiving device or information the same as the reference information. The differential communication device further includes difference-information generating means for generating the difference information from the information to be transmitted, based on the reference information obtained by the reference-information obtaining means; and transmitting means for transmitting the difference information generated by the difference-information generating means to the receiving device. The differential communication device further includes receiving means for receiving difference information from the transmitting device; information restoring means for restoring, from the difference information received by the receiving means, the information to be transmitted, based on the reference information used by the differential communication device.

With this arrangement, when the differential communication device is connected with the receiving device in a differential communication system of the fifth aspect to be able to communicate therewith, the match determining means determines whether or not reference information used by the differential communication device and reference information used by the receiving device are the same. As a result, when it is determined that both pieces of the reference information are not the same, the reference-information obtaining means obtains the reference information used by the receiving device or information the same as the reference information; the difference-information generating means generates, from information to be transmitted, difference information, based on the obtained reference information; and the transmitting means transmits the generated difference information to the receiving device.

Also, when the differential communication device is connected with the transmitting device in a differential communication system of the fifth aspect to be able to communicate therewith and the receiving means receives difference information from the transmitting device, the information restoring means restores, from the received difference information, information to be transmitted, based on reference information used by the differential communication device.

Meanwhile, to achieve the foregoing object, according to a fourteenth aspect of the present invention, there is provided a program that is executed by a differential communication device of the eigth aspect. The differential communication device is implemented by a computer. The program causes the computer to realize difference-information generating means for generating the difference information from the information to be transmitted, based on reference information used by the differential communication device; and transmitting means for transmitting the difference information generated by the difference-information genertimg means to the transmitting device.

With this arrangement, causing the differential communication device to read the program and causing the differential communication device to perform the processes in accordance with the read program can provide the same advantage as the differential communication device recited in the eighth aspect.

In addition, according a fifteenth aspect of the present invention, there is provided a differential communication program executed by a differential communication device of the ninth aspect. The differential communication device is implemented by a computer. The program causes the computer to realize receiving means for receiving the difference information from the transmitting device; match determining means for determining whether or not the reference information used by the differential communication device and the reference information used by the transmitting device are the same; reference-information obtaining means for obtaining, when the match determining means determines that they are not the same, the reference information used by the transmitting device or information the same as the reference information; and information restoring means for restoring, from the difference information received by the receiving means, the information to be transmitted, based on the reference information obtained by the reference-information obtaining means.

With this arrangement, causing the differential communication device to read the program and causing the differential communication device to perform the processes in accordance with the read program can provide the same advantage as the differential communication device recited in the ninth aspect.

Additionally, according to a sixteenth aspect of the present invention, there is provide a differential communication program executed by a differential communication device of the tenth aspect. The differential communication device is implemented by a computer. The program causes the computer to realize difference-information generating means for generating, based on reference information used by the differential communication device, the difference information from the information to be transmitted; transmitting means for transmitting the difference information generated by the difference-information generating means to the receiving device; receiving means for receiving the difference information from the transmitting device; match determining means for determining whether or not the reference information used by the differential communication device and the reference information used by the transmitting device are the same; reference-information obtaining means for obtaining, when the match-determining means determines that they are not the same, the reference information used by the transmitting device or information the same as the reference information; and information restoring means for restoring, from the difference information received by the receiving means, the information to be transmitted, based on the reference information obtained by the reference-information obtaining means.

With this arrangement, causing the differential communication device to read the program and causing the differential communication device to perform the processes in accordance with the read program can provide the same advantage as the differential communication device recited in the tenth aspect.

Furthermore, according to a seventeenth aspect of the present invention, there is provided a differential communication program executed by a differential communication device of the eleventh aspect. The differential communication device is implemented by a computer. The program causes the computer to realize match determining means for determining whether or not the reference information used by the differential communication device and the reference information used by the receiving device are the same; reference-information obtaining means for obtaining, when the match determining means determines that they are not the same, the reference information used by the receiving device or information the same as the reference information; difference-information generating means for generating the difference information from the information to be transmitted, based on the reference information obtained by the reference-information obtaining means; and transmitting means for transmitting the difference information generated by the difference-information generating means to the receiving device.

With this arrangement, causing the differential communication device to read the program and causing the differential communication device to perform the processes in accordance with the read program can provide the same advantage as the differential communication device recited in the eleventh aspect.

In addition, according to an eighteenth aspect of the present invention, there is provided a differential communication program executed by a differential communication device of the twelfth aspect. The differential communication device is implemented by a computer. The program causes the computer to realize receiving means for receiving the difference information from the transmitting device and information restoring means for restoring, from the difference information received by the receiving means, the information to be transmitted, based on the reference information used by the differential communication device.

With this arrangement, causing the differential communication device to read the program and causing the differential communication device to perform the processes in accordance with the read program can provide the same advantage as the differential communication device recited in the twelfth aspect.

Additionally, according to a nineteenth aspect of the present invention, there is provided a differential communication program executed by a differential communication device of the thirteenth aspect. The differential communication device is implemented by a computer. The program causes the computer to realize match determining means for determining whether or not the reference information used by the differential communication device and the reference information used by the receiving means are the same; reference-information obtaining means for obtaining, when the match determining means determines that they are not the same, the reference information used by the receiving device or information the same as the reference information; difference-information generating means for generating the difference information from the information to be transmitted, based on the reference information obtained by the reference information obtaining means; transmitting means for transmitting the difference information generated by the difference-information generating means to the receiving device; receiving means for receiving difference information from the transmitting device; and information restoring means for restoring, from the difference information received by the receiving means, the information to be transmitted, based on the reference information used by the differential communication device.

With this arrangement, causing the differential communication device to read the program and causing the differential communication device to perform the processes in accordance with the read program can provide the same advantage as the differential communication device recited in the thirteenth aspect.

Meanwhile, to achieve the foregoing object, according to a twentieth aspect of the present invention, there is provided a differential communication method for performing differential communication between a first communication device and a second communication device. The first communication device and the second communication device are connected to be able to communicate with each other. The differential communication method includes the steps of changing reference information in one or both of the first communication device and the second communication device so that reference information used by the first communication device and reference information used by the second communication device become the same during differential communication, and using difference information generated based on the reference information to perform differential communication between the first communication device and the second communication device.

BRIEF DESCRIPTION OF THE DRAWINGS

FIG. 1 is a diagram illustrating the configuration of a network system according to the present invention.

FIG. 2 is a block diagram illustrating the configuration of a portable terminal 100.

FIG. 3 shows the data structures of a profile A and reference information A.

FIG. 4 shows the data structure of the profile A in an XML format.

FIG. 5 shows the data structures of a profile B and reference information B.

FIG. 6 shows the data structure of a profile C.

FIG. 7 is a flow chart showing a difference-information transmitting process.

FIG. 8 is a flow chart showing a difference-information receiving process.

FIG. 9 is a flow chart showing a reference-information transmitting process.

FIG. 10 shows difference information communicated between portable terminals 100 to 120.

FIG. 11 shows the data structure of the difference information in an XML format.

FIG. 12 illustrates the configuration of a network system according to the present invention.

DETAILED DESCRIPTION OF PREFERRED EMBODIMENTS

A first embodiment of the present invention will be described below with reference to the accompanying drawings. FIGS. 1 to 11 illustrate a differential communication system, a differential communication device, a differential communication program, and a differential communication method according to an embodiment of the present invention.

In this embodiment, as shown in FIG. 1, a differential communication system, a differential communication device, a differential communication program, and a differential communication system according to the present invention are applied to a case in which a plurality of portable terminals 100 to 120 dynamically configures a wireless network and performs differential communication over the wireless network.

First, the configuration of a network system according to the present invention will be described with reference to FIG. 1. FIG. 1 is a diagram illustrating the configuration of a network system according to the present invention.

Referring to FIG. 1, the portable terminals 100 to 120 dynamically configure a wireless network in conjunction with other portable terminals that are present within a given communication area (e.g., within a region of 10 m radius), and are connected to be able to perform communication over the wireless network. In the example of FIG. 1, the portable terminal 100 and the portable terminal 110 are included in a communication area 190 to be able to communicate with each other, and the portable terminal 110 and the portable terminal 120 are included in a communication area 192 to be able to communicate with each other.

Examples of dynamically-configured wireless networks include a case in which the users of the portable terminals 100 to 120 meet with each other in a town, school, or workplace and configure a wireless network on the spot without performing any unique setting for each of the portable terminals 100 to 120.

Next, the configuration of the portable terminal 100 will be described in detail with reference to FIG. 2. FIG. 2 is a block diagram illustrating the configuration of the portable terminal 100. Since the portable terminals 100 to 120 are configured to have the same configuration, the configuration of the portable terminal 100 will be described below and the configurations of the portable terminals 110 and 120 are omitted except for data structures in the RAMs thereof.

As shown in FIG. 2, the portable terminal 100 includes a CPU 30, a ROM 32, a RAM 34, and an interface (I/F) 38, which are interconnected via a bus 39, i.e., a signal line for transferring data, to allow data communication. The interface 38 serves as signal lines for transferring data to external devices. The ROM 32 pre-stores, in a predetermined region, a control program and the like for the CPU 30. The CPU 30 performs computation and controls the entire system in accordance with the control program. The RAM 34 stores data read from the ROM 32 and the like and computational results needed in the computational process by the CPU 30. The interface 38 allows data input and output to and from external devices.

A wireless communication device 40, a key panel 42, and an LCD (Liquid Crystal Display) 44 are connected as the external devices to the interface 38. The wireless communication device 40 performs wireless communication with the other portable terminals 110 and 120, the key panel 42 serves as a human interface to allow data input with a plurality of keys, and the LCD 44 displays a screen in accordance with an image signal.

As shown in FIG. 3, the RAM 34 stores a profile A concerning the user of the portable terminal 100 and reference information A. FIG. 3 shows the data structures of the profile A and the reference information A.

As shown in FIG. 3(a), the profile A contains a field 300 in which the user's ID is registered, a field 302 in which the user's name is registered, a field 304 in which the user's age is registered, a field 306 in which the user's occupation is registered, and a field 308 in which the user's address is registered. In the example of FIG. 3(a), "0001" is registered as the user's ID in the field 300, "A" is registered as the name in the field 302, "30" is registered as the age in the field 304, "teacher" is registered as the occupation in the field 306, and "Suwa" is registered as the address in the field 308.

As shown in FIG. 4, the profile A can be configured, for example, in a so-called "XML (extensible Markup Language) format" in which a setting value is stated between a given start tag and an end tag for each setting item. Not only the profile A but also the reference information A and B and profiles B and C can be configured in the same format. FIG. 4 shows the data structure of the profile A in an XML format.

The reference information A is used to generate difference information when the portable terminal 100 performs differential communication. As shown in FIG. 3(b), the reference information A contains a field 310 corresponding to the field 300, a field 312 corresponding to the field 302, a field 314 corresponding to the field 304, a field 316 corresponding to the field 306, a field 318 corresponding to the field 308, and a field 320 in which reference information ID for identifying reference information is registered. In the example of FIG. 3(b), "0097" is registered in the field 310, "X" is in the field 312, "30" is in the field 314, "lawyer" is in the field 316, "Suwa" is in the field 318, and "0001" is registered as the reference information ID in the field 320. Since the contents of the fields 310 to 318 are created with random variables or the like, the contents thereof are of no use, thus having no effect on confidentiality even if they are leaked or intercepted in the process of communication.

Meanwhile, as shown in FIG. 5, the RAM in the portable terminal 110 stores the profile B concerning the user of the portable terminal 110 and reference information B. FIG. 5 shows the data structures of the profile B and the reference information B.

As shown in FIG. 5(a), the profile B contains a field 330 in which the user's ID is registered, a field 332 in which the user's name is registered, a field 334 in which the user's age is registered, a field 336 in which the user's occupation is registered, and a field 338 in which the user's address is registered. In the example of FIG. 5(a), "0002" is registered as the user's ID in the field 330, "B" is registered as the name in the field 332, "35" is registered as the age in the field 334, "doctor" is registered as the occupation in the field 336, and "Matsumoto" is registered as the address in the field 338.

The reference information B is used to generate difference information when the portable terminal 110 performs differential communication. As shown in FIG. 5(b), the reference information B contains a field 340 corresponding to the field 330, a field 342 corresponding to the field 332, a field 344 corresponding to the field 334, a field 346 corresponding to the field 336, a field 348 corresponding to the field 338, and a field 350 in which reference information ID for identifying reference information is registered. In the example of FIG. 5(b), "0098" is registered in the field 340, "Y" is in the field 342, "35" is in the field 344, "teacher" is in the field 346, "Matsumoto" is in the field 348, and "0002" is registered as the reference information ID in the field 350. Since the contents of the fields 340 to 348 are created with random variables or the like, the contents thereof are of no use, thus having no effect on confidentiality even if they are leaked or intercepted in the process of communication.

Meanwhile, as shown in FIG. 6, the RAM in the portable terminal 120 stores a profile C concerning the user of the portable terminal 120. FIG. 6 shows the data structure of the profile C.

As shown in FIG. 6(a), the profile C contains a field 360 in which the user's ID is registered, a field 362 in which the user's name is registered, a field 364 in which the user's age is registered, a field 366 in which the user's occupation is registered, and a field 368 in which the user's address is registered. In the example of FIG. 6(a), "0003" is registered as the user's ID in the field 360, "C" is registered as the name in the field 362, "35" is registered as the age in the field 364, "lawyer" is registered as the occupation in the field 366, and "Suwa" is registered as the address in the field 368.

Referring back to FIG. 2, the configuration of the CPU 30 and processes executed in the CPU 30 will be described.

The CPU 30 is implemented with a micro processing unit (MPU) or the like. The CPU 30 causes a predetermined program stored in a given region in the ROM 32 to start, and, in accordance with the program, executes, in a time-sharing manner, a difference-information transmitting process, a difference-information receiving process, and a reference-information transmitting process shown in flow charts in FIGS. 7, 8, and 9, respectively.

First, the difference-information transmitting process will be described in detail with reference to FIG. 7. FIG. 7 is a flow chart showing the difference-information transmitting process.

The difference-information transmitting process is a process in which difference information is generated from information to be transmitted, based on reference information in the RAM 34, and the generated difference information is transmitted to the other portable terminals 110 and 120. When the process is executed in the CPU 30, the process first proceeds to step S100.

In step S100, a determination is made as to whether or not there is a transmission request for the other portable terminals 110 and 120. When it is determined that there is a transmission request (Yes), the process proceeds to step S102. When it is determined otherwise (No), the process stands by at step S100 until there is a transmission request.

In step S102, reference information is read from the RAM 34, and the process advances to step S104, in which difference information is generated from information to be transmitted, based on the read reference information. The process then proceeds to step S106, in which reference information ID is added to the generated difference information. The process then proceeds to step S108, in which the difference information to which the reference information ID is added is transmitted to an intended portable terminal and the series of processes end, so that the process returns to the initial process.

Next, the difference-information receiving process will be described in detail with reference to FIG. 8. FIG. 8 is a flow chart showing the difference-information receiving process.

The difference-information receiving process is a process in which difference information is received from the other portable terminals 110 and 120, and information to be transmitted is restored from the difference information, based on the reference information in the RAM 34. When the process is executed in the CPU 30, the process first proceeds to step S200.

In step S200, a determination is made as to whether or not difference information is received. When it is determined that difference information is received (Yes), the process proceeds to step S202. When it is determined otherwise (No), the process stands by at step S200 until difference information is received.

In step S202, reference information ID is obtained from the difference information, and the process proceeds to step S204, in which a determination is made as to whether or not the obtained reference information ID and the reference information ID of reference information in the RAM 34 match with each other. When it is determined that both pieces of the reference information ID do not match with each other (No), the process proceeds to step S206, in which a request for providing reference information is transmitted to a portable terminal that is a transmission source of the difference information, and the process proceeds to S208.

In step S208, a determination is made as to whether or not reference information is received. When it is determined that reference information is received (Yes), the process proceeds to step S210. When it is determined otherwise (No), the process stands by at step 208 until reference information is received.

In step S210, the received reference information is stored in the RAM 34. The process then proceeds to step S212, in which, based on the reference information, the information to be transmitted is restored from the received difference information, and the series of processes end, so that the process returns to the initial process.

Meanwhile, in step S204, when it is determined that the obtained reference information ID and the reference information ID of reference information in the RAM 34 match with each other (Yes), the process proceeds to step S214, in which reference information that is identified with the obtained reference ID is read from the RAM 34, and the process proceeds to step S212.

Next, the reference-information transmitting process will be described in detail with reference to FIG. 9. FIG. 9 is a flow chart showing the reference-information transmitting process.

The reference-information transmitting process is a process in which reference information in the RAM 34 is transmitted in response to a request for providing reference information. When the process is executed in the CPU 30, the process first proceeds to step S300.

In step S300, a determination is made as to whether or not a request for providing reference information is received. When it is determined that a request for provision is received (Yes), the process proceeds to step S302. When it is determined otherwise (No), the process stands by at step S300 until a request for provision is received.

In step S302, reference information in accordance with the request for provision is read from the RAM 34, and the process proceeds to step S304, in which the read reference information is transmitted to an intended portable terminal. Then, the series of processes end and the process returns to the initial process.

The operation of this embodiment will now be described with reference to FIG.10. FIG. 10 shows difference information communicated between the portable terminals 100 to 120.

In this case, for example, as shown in FIG. 1, a description is given for a case in which the portable terminals 100 and 110 are connected to be able to communicate with each other and the portable terminals 110 and 120 are connected to be able to communicate with each other, and the user of the portable terminal 100 searches for a 35-year-old person who lives in Suwa, by way of example.

At the portable terminal 100, the user thereof first gives a search request, with the key panel 42, by entering "35" as the age of the person to be searched for and "Suwa" as the address of the person.

At the portable terminal 100, upon input of the search request together with the information concerning the person to be searched for, search condition information in which the user's ID, name and occupation are set as "*", the age is set as "35", and the address is set as "Suwa" is created. In this case, a user ID, name, or occupation designated with "*" means that it is designated with a so-called "wild card" and satisfies a search condition of any user ID, name or occupation.

Next, through steps S100 to S104, reference information A is read from the RAM 34, and, based on the read reference information A, difference information is generated from the search condition information as information to be transmitted.

The difference information is generated by comparing the search condition information and the reference information A and by extracting the difference. Regulations for the extraction are such that, when user IDs, names, ages, occupations, or addresses are the same, the same item is omitted; when user IDs, names, occupations, or addresses are different from each other, it is entered as it is; and when the ages are different from each other, an age difference is determined. In accordance with these extraction regulations, the difference information as shown in FIG. 10(a) is provided. First, the user ID, name, and occupation in the search condition information are all designated with "*" and the user ID, name, and occupation in the reference information A are "0097", "X", and "lawyer", respectively, which are different from each other. Thus, "*" is set for the user ID, name, and occupation. Also, the age in the search condition information is "35" and the age in the reference information A is "30", which are different from each other. Thus, "+5" is set as the age difference. Further, the address in the search condition information is "Suwa" and the address in the reference information A is "Suwa", which are the same. Thus, the item therefor is omitted.

As shown in FIG. 11, the difference information can be configured, for example, in a so-called "XML format" in which a setting value is stated between a given start tag and an end tag for each setting item. FIG. 11 shows the data structure of the difference information in an XML format.

Through steps S106 to S108, since the reference information ID of the reference information A is "0001", reference information ID "0001" is added to the difference information and the resulting difference information is transmitted to the portable terminal 110.

At the portable terminal 110, upon receipt of the difference information, through steps S200 to S204, the reference information ID is obtained from the received difference information, and a determination is made as to whether or not the obtained reference information ID and the reference information ID of the reference information B stored in the RAM match with each other. In this case, since the obtained reference information ID is "0001" and the reference information ID of the reference information B is "0002", it is determined that they do not match with each other. Upon determination that they do not match, through step S206, a request for providing reference information is transmitted to the portable terminal 100.

At the portable terminal 100, upon receipt of the request for providing reference information, through steps S300 to S304, the reference information A is read from the RAM and the read reference information A is transmitted to the portable terminal 110.

At the portable terminal 110, upon receipt of the reference information A, through steps S210 and S212, the received reference information A is stored in the RAM, and, based on the received reference information A, the search condition information is restored from the difference information.

The search condition information is restored by comparing the difference information and the reference information A and by extracting the difference. Regulations for the extraction are such that, when an item for a user ID, name, age, occupation, or address exists in the difference information, the setting in the difference information is adopted; and when an item therefor does not exist in the difference information, the setting in the reference information A is adopted. Further, when an item for an age exists in the difference information, a value that is determined by adding a setting value for the age to a setting value in the reference information is adopted. When an item for an age does not exist in the difference information, the setting in the reference information A is adopted. In accordance with these extraction regulations, the original search condition information can be restored.

Next, upon restoration of the search condition information, based on the search condition information, a determination is made as to whether or not the profile B matches with the search condition. In this case, the age in the search condition information is "35" and the age in the profile B is "30", which are different from each other. Thus, it is determined that they do not match with each other. When it is determined that they do not match, the same search condition information is transferred to another portable terminal 120 with which the portable terminal 110 can communicate.

At the portable terminal 110, when it is determined that the search condition information is to be transferred, through steps S100 to S104, the reference information B, of the reference information A and B, is read from the RAM 34, and, based on the read reference information B, difference information is generated from the search condition information as information to be transmitted. In this case, the reason why the reference information B, of the reference information A and B, is read is to minimize the use of the same reference information in terms of improving confidentiality.

The difference information is generated by comparing the search condition information and the reference information B and by extracting the difference. In this case, the difference information as shown in FIG. 10(b) is provided. First, the user ID, name, and occupation in the search condition information are all designated with "*" and the user ID, name, and occupation in the reference information B are "0098", "Y", and "teacher", respectively, which are different from each other. Thus, "*" is set for the user ID, name, and occupation. Further, the age in the search condition information is "35" and the age in the reference information B is "35", which are the same. Thus, the item therefor is omitted. Also, the address in the search condition information is "Suwa" and the address in the reference information B is "Matsumoto", which are different from each other. Thus, "Suwa" is set as the address.

Through steps S106 and S108, since the reference information ID of the reference information B is "0002", reference information ID "0002" is added to the difference information and the resulting difference information is transmitted to the portable terminal 120.

At the portable terminal 120, through steps S200 and S202, upon receipt of the difference information, the reference information ID "0002" is obtained from the received difference information. In this case, since no reference information exists in the RAM, a request for providing reference information is transmitted to the portable terminal 110 through step S206.

At the portable terminal 110, upon receipt of the request for providing reference information, through steps S300 to S304, the reference information B is read from the RAM and the read reference information B is transmitted to the portable terminal 120.

At the portable terminal 120, upon receipt of the reference information B, through steps S210 and S212, the received reference information B is stored in the RAM and, based on the received reference information B, the search condition information is restored from the difference information.

Next, based on the restored search condition information, a determination is made as to whether or not the profile C matches with the search condition. In this case, the age and the address in the search condition information are "35" and "Suwa" and the age and the address in the profile C are "35" and "Suwa", which are the same. Thus, it is determined that they match with each other. Upon determination that they match, difference information is generated from the profile C, based on the reference information B.

The difference information is generated by comparing the profile C and the reference information B and by extracting the difference. In this case, the difference information as shown in FIG. 10(c) is provided. First, the user ID, name, occupation, and address in the profile C are "0003, "C", "lawyer", and "Suwa", respectively, and the user ID, name, occupation, and address in the reference information B are "0098, "Y", "teacher", and "Matsumoto", respectively, which are different from each other. Thus, "0003", "C, "lawyer", and "Suwa" are set as the user ID, name, occupation, and address, respectively. Further, the age in the profile C is "35" and the age in the reference information B is "35", which are the same. Thus, the item therefor is omitted.

Through steps S106 and S108, since the reference information ID of the reference information B is "0002", reference information ID "0002" is added to the difference information and the resulting difference information is transmitted to the portable terminal 110.

At the portable terminal 110, upon receipt of the difference information, through steps S200 to S204, the reference information ID is obtained from the received difference information, and a determination is made as to whether or not the obtained reference information ID and the reference information ID of the reference information B stored in the RAM match with each other. In this case, since the obtained reference information ID is "0002" and the reference information ID of the reference information B is "0002", it is determined that they match with each other. Upon determination that they match, through steps S214 and S212, the reference information B is read from the RAM, and, based on the read reference information B, the profile C is restored from the difference information.

Next, upon restoration of the profile C, the reference information A is read from the RAM, and, based on the read reference information A, difference information is generated from the profile C.

The difference information is generated by comparing the profile C and the reference information A and by extracting the difference. In this case, the difference information as shown in FIG. 10(d) is provided. The user ID and the name in the profile C are "0003" and "C" and the user ID and the name in the reference information A are "0097" and "X", which are different from each other. Thus, "0003" and "C" are set as the user ID and the name, respectively. Also, the age in the profile C is "35" and the age in the reference information A is "30", which are different from each other. Thus, "+5" is set as the age difference. Further, the occupation and the address in the profile C are "lawyer" and "Suwa" and the occupation and the address in the reference information A are "lawyer" and "Suwa", which are the same. Thus, the items therefor are omitted.

Through steps S106 and S108, since the reference information ID of the reference information A is "0001", reference information ID "0001" is added to the difference information and the resulting difference information is transmitted to the portable terminal 100.

At the portable terminal 100, upon receipt of the difference information, through steps S200 to S204, the reference information ID is obtained from the received difference information, and a determination is made as to whether or not the obtained reference information ID and the reference information ID of the reference information A stored in the RAM 34 match with each other. In this case, since the obtained reference information ID is "0001" and the reference information ID of the reference information B is "0001", it is determined that they match with each other. Upon determination that they match, through steps S214 and S212, the reference information A is read from the RAM 34, and, based on the read reference information A, the profile C is restored from the difference information.

The restored profile C is, for example, displayed on the LCD 42, so that the user of the portable terminal 100 can realize that the intended person has been found and the details of the person.

In the above, the profile C is transmitted from the portable terminal 120 to the portable terminal 100, however, the present invention is not limited thereto. The notification about an intended person being found may be transmitted to the portable terminal 100 via the portable terminal 110. In this case, the location and the like of the portable terminal 120 may also be transmitted together.

In this manner, in the this embodiment, each of the portable terminals 100 to 120 generates difference information from information to be transmitted, based on reference information held by itself and transmits the generated difference information to an intended portable terminal. Meanwhile, upon receipt of difference information, each of the portable terminals 100 to 120 determines whether or not the reference information held by the transmission source of the difference information and reference information held by itself match with each other. Upon determining that they are not the same, each of the portable terminals 100 to 120 obtains the reference information held by the transmission source of the difference information, and, based on the obtained reference information, restores, from the received difference information, the information to be transmitted.

With this arrangement, during differential communication, pieces of reference information held by the portable terminals 100 to 120 become common. Thus, in a dynamically configured network, differential communication can be performed between the portable terminals 100 to 120. As a result, difference information is communicated between the portable terminals 100 to 120, thereby improving confidentiality in the communication of the profiles A to C.

Additionally, in this embodiment, each of the portable terminals 100 to 120 adds the reference information ID of reference information held by itself to difference information and transmits the resulting difference information, and, on the other hand, it obtains reference information ID from received reference information and determines whether or not reference information identified with the obtained reference information ID and reference information held by itself are the same.

Thus, by only receiving difference information, each of the portable terminals 100 to 120 can realize whether or not reference information held by the transmission source of the difference information and reference information held by itself are the same. As a result, there is no need to have a process for inquiring a source that has transmitted difference information, to determine if there is a match, so that the communication procedures become relatively simple.

In addition, in this embodiment, when transferring information, as reference information used at the time of transmitting the information, each of the portable terminals 100 to 120 is adapted to select reference information that is different from one used at the time of receiving the information.

This can reduce the possibility that the same reference information is used continuously, so that confidentiality in communication can be relatively improved.

In the first embodiment described above, each portable terminal 100 to 120 corresponds to a first communication device recited in a 1st or 20th aspect; a second communication device recited in a 1st or 20th aspect; a transmitting device recited in 2nd, 3rd, 4th, 6th, 9th, 10th, 15th, or 16th aspect; or a receiving device recited in a 2nd, 3rd, 4th, 6th, 8th, 10th, 14th, or 16th aspect. Steps S104 and S106 correspond to difference-information generating means recited in a 2nd, 4th, 8th, 10th, 14th, or 16th aspect; step S108 corresponds to transmitting means recited in a 2nd, 8th, 10th, 14th, or 16th aspect; and steps S202 and S204 correspond to match determining means recited in a 2nd, 3rd, 4th, 9th, 10th, 15th, or 16th aspect.

In the first embodiment described above, steps S206 and S208 correspond to reference-information changing means recited in a 2nd aspect or reference-information obtaining means recited in a 3rd, 9th, 10th, 15th, or 16th aspect; step S200 corresponds to receiving means recited in a 2nd, 3rd, 4th, 9th, 10th, 15th, or 16th aspect; and step S212 corresponds to information restoring means recited in a 2nd, 3rd, 9th, 10th, 15th, or 16th aspect.

A second embodiment of the present invention will now be described with reference to the accompanying drawings. FIG.

12 is a view illustrating a differential communication system, a differential communication device, a differential communication program, and a differential communication method according to an embodiment of the present invention.

In this embodiment, as shown in FIG. 12, a differential communication system, a differential communication device, a differential communication program, and a differential communication method according to the present invention are applied to a case in which a plurality of client terminals $C_1$ to $C_3$ and a server terminal S dynamically configure a wireless network and the plurality of client terminals $C_1$ to $C_3$ performs differential communication with the server terminal S over the wireless network.

First, the configuration of a network system according to the present invention will be described with reference to FIG. 12. FIG. 12 is a view illustrating the configuration of a network system according to the present invention.

Referring to FIG. 12, the client terminals $C_1$ to $C_3$ dynamically configure a wireless network in conjunction with the server terminal S that is present within a given communication area (e.g., within a region of 10 m radius), and are connected to the server terminals S to be able to perform communication over the wireless network.

The region surrounding the server terminal S and the client terminals $C_1$ to $C_3$ is divided into 25 rectangular sections in total; i.e., five sections in the vertical direction and five sections in the horizontal direction. The server terminal S is adapted to control the location of each client terminal $C_1$ to $C_3$ as each section being a minimum unit. In the example of FIG. 12, the server terminal S is located at a coordinate (2, 2), and the client terminals $C_1$ to $C_3$ are located at coordinates (3, 3), (1, 4), and (5, 1), respectively.

Each of the server terminal S and the client terminals $C_1$ to $C_3$ has the same configuration as a typical computer in which a CPU, ROM, RAM, interface, and the like are connected via a bus. When performing differential communication, each of the server terminal S and the client terminals $C_1$ to $C_3$ executes processes corresponding the processes shown in FIGS. 7 to 9.

The position coordinate of the server terminal S is used for reference information, and a time stamp that is commonly used in calculators is used for reference information ID. The time stamp indicates information in a cumulative total of seconds elapsed from a predetermined reference time (e.g., "00:00:00, Jan. 1, 1970"). For example, a time stamp of "1000110319" represents "17:25:19, Sep. 10, 2001".

The operation of this embodiment will now be described with reference to the accompanying drawings.

In this case, a case in which the server terminal S and the client terminals $C_1$ to $C_3$ are located at positions shown in FIG. 12 will be described by way of example. In this case, suppose the client terminals $C_1$ and $C_2$ hold reference information in advance, and the client terminal $C_3$ does not hold any reference information.

To update the position information of each client terminal $C_1$ to $C_3$, the server terminal S broadcasts, to each client terminal $C_1$ to $C_3$, a request that a notification about the current position information thereof is to be transmitted. Specifically, through steps S100 to S104, reference information is read from the RAM, and, based on the read reference information, difference information is generated from the notification request as information to be transmitted. Next, through steps S106 and S108, reference information ID is added to the difference information, and the resulting difference information is transmitted to each client terminal $C_1$ to $C_3$.

At each of the client terminals $C_1$ and $C_2$, upon receipt of the difference information, through steps S200 to S204, the reference information ID is obtained from the received difference information, and a determination is made as to whether or not the obtained reference information ID and the reference information ID of reference information stored in the RAM match with each other. In this case, since both pieces of the reference information are the same, it is determined that they match with each other. Upon determination that they match, reference information is read from the RAM, and the notification request is restored from the difference information, based on the read reference information (2, 2), so that each of the client terminals $C_1$ and $C_2$ realizes that the server terminal S has requested that a notification about the current location is to be transmitted to the server terminal S. Thus, at the client terminals $C_1$ and $C_2$, based on the reference information (2, 2) in the RAM, difference information (1, 1) and (−1, 2) is generated from position information indicating the current position coordinates (3, 3) and (1, 4) of the client terminals $C_1$ and $C_2$, respectively. Reference information IDs are then added to the corresponding difference information and the resulting difference information is transmitted to the server terminal S.

At the server terminal S, upon receipt of the difference information, through steps S200 to S204, the reference information IDs are obtained from the received difference information, and a determination is made as to whether or not the obtained reference information IDs and the reference information ID of reference information stored in the RAM match with each other. In this case, since both pieces of the reference information are the same, it is determined that they match with each other. Upon determination that they match, through steps S214 and S212, the reference information is read from the RAM, and, based on the read reference information (2, 2), the position information (3, 3) and (1, 4) of the client terminals $C_1$ and $C_2$ are restored from the difference information (1, 1) and (−1, 2), respectively. In this manner, the position information of the client terminals $C_1$ and $C_2$ is updated.

Meanwhile, at the client terminal $C_3$, through steps S200 and S202, upon receipt of the difference information, the reference information ID is obtained from the received difference information. In this case, since no reference information exists in the RAM, a request for providing reference information is transmitted to the server terminal S through step S206.

At the server terminal S, upon receipt of the request for providing reference information, through steps S300 to S304, the reference information is read from the RAM and the read reference information (2, 2) is transmitted to the client terminal $C_3$.

At the client terminal $C_3$, upon receipt of the reference information, through steps S210 and S212, the received reference information is stored in the RAM, and the notification request is restored from the difference information, based on the received reference information (2, 2), so that the client terminal $C_3$ realizes that the server terminal S has requested that the notification about the current location to be transmitted. Thus, at the client terminal $C_3$, based on the reference information (2, 2) in the RAM, difference information (3, −1) is generated from position information indicating the current position coordinate (5, 1) of the client terminal $C_3$. Reference information ID is then added to the difference information and the resulting difference information is transmitted to the server terminal S.

t the server terminal S, upon receipt of the difference information, through steps S200 to S204, the reference information ID is obtained from the received difference information, and a determination is made as to whether or not the obtained reference information ID and the reference information ID of reference information stored in the RAM match with each other. In this case, since both pieces of the reference information are the same, it is determined that they match with each other. Upon determination that they match, through steps S214 and S212, the reference information is read from the RAM, and, based on the read reference information (2, 2), the position information (5, 1) of the client terminal $C_3$ is restored from the difference information (3, −1). In this manner, the position information of the client terminal $C_3$ is updated.

While the description in the above has been given for a case in which the server terminal S transmits, to each client terminal $C_1$ to $C_3$, a request that an notification about the current position thereof is to be transmitted to the server terminal S, the same manner can be applied to a case in which each of the client terminals $C_1$ to $C_3$ is used as a vehicle navigation system or the like and the server terminal S gives an instruction for a destination to which each client terminal $C_1$ to $C_3$ moves.

Thus, in the present invention, each of the server terminal S and the client terminals $C_1$ to $C_3$ generates difference information from information to be transmitted, based on reference information held by itself, and transmits the generated difference information to an intended terminal. On the other hand, upon receiving difference information, each of the server terminal S and the client terminals $C_1$ to $C_3$ determines whether or not the reference information held by a transmission source of the difference information and reference information held by itself are the same. When determining that they are not the same, it obtains the reference information held by the transmission source of the difference information, and, based on the obtained reference information, restores, from the received difference information, the information to be transmitted.

With this arrangement, reference information held by the server terminal S and reference information held by the client terminals $C_1$ to $C_3$ become common. Thus, in a dynamically configured network, differential communication can be performed between the server terminal S and the client terminals $C_1$ to $C_3$. Thus, a relative coordinate is communicated between the server terminal S and the client terminals $C_1$ to $C_3$, thereby allowing an improvement in confidentiality of the current positions of the client terminals $C_1$ to $C_3$.

Additionally, in this embodiment, each of the server terminal S and the client terminals $C_1$ to $C_3$ adds the reference information ID of reference information held by itself to the difference information and transmits the resulting difference information, and, on the other hand, it obtains the reference information ID from the received difference information and determines whether or not reference information identified with the obtained reference information ID and reference information held by itself are the same.

With this arrangement, by only receiving difference information, each of the server terminal S and the client terminals $C_1$ to $C_3$ can realize whether or not reference information held by the transmission source of the difference information and reference information held by itself are the same. As a result, there is no need to have a process for inquiring a source that has transmitted difference information, to determine if there is a match, so that the communication procedures become relatively simple.

In the second embodiment, each of the server terminal S and the client terminals $C_1$ to $C_3$ corresponds to a first communication device recited in a 1st or 20th aspect; a second communication device recited in a 1st or 20th aspect; a transmitting device recited in a 2nd, 3rd, 4th, 6th, 9th, 10th, 15th, or 16th aspect; or a receiving device recited in a 2nd, 3rd, 4th, 6th, 8th, 10th, 14th, or 16th aspect. Steps S104 and S106 correspond to difference-information generating means recited in a 2nd, 4th, 8th, 10th, 14th, or 16th aspect; step S108 corresponds to transmitting means recited in a 2nd, 8th, 10th, 14th, or 16th aspect; and steps S202 and S204 correspond to match determining means recited in a 2nd, 3rd, 4th, 9th, 10th, 15th, or 16th.

In the second embodiment described above, steps S206 and S208 correspond to reference-information changing means recited in a 2nd aspect or reference-information obtaining means recited in a 3rd, 9th, 10th, 15th, or 16th aspect; step S200 corresponds to receiving means recited in a 2nd, 3rd, 4th, 9th, 10th, 15th, or 16 aspect; and step S212 corresponds to information restoring means recited in a 2nd, 3rd, 9th, 10th, 15th, or 16th aspect.

In the first embodiment described above, each of the portable terminals 100 to 120 generates difference information from information to be transmitted, based on reference information held by itself, and transmits the generated difference information to an intended portable terminal. Meanwhile, upon receiving difference information, each of the portable terminals 100 to 120 determines whether or not reference information held by the transmission source of the difference information and the reference information held by itself match with each other. Upon determining that they are not the same, each of the portable terminals 100 to 120 obtains the reference information held by the transmission source of the difference information, and, based on the obtained reference information, restores, from the received difference information, the information to be transmitted. However, the configuration thereof is not limited thereto, and the following configuration may also be employed.

Each of the portable terminals 100 to 120 determines whether or not reference information held by a transmission destination of difference information and reference information held by itself are the same. Upon determining that they are not the same, each of the portable terminals 100 to 120 obtains the reference information held by the transmission destination of the difference information, and, based on the obtained reference information, generates difference information from information to be transmitted and transmits the generated difference information to an intended portable terminal. Also, upon receiving difference information, based on reference information held by itself, each of the portable terminals 100 to 120 restores, from the received difference information, information to be transmitted.

In this case, each portable terminal 100 to 120 corresponds to a first communication device recited in a 1st aspect; a second communication device recited in a 1st aspect, a transmitting device recited in a 2nd, 5th, 12th, 13th, 18th, or 19th aspect; or a receiving device recited in a 2nd, 5th, 11th, 13th, 17th, or 19th aspect. Steps S104 and S106 correspond to difference-information generating means recited in a 2nd, 5th, 11th, 13th, 17th, or 19th aspect. Further, step S108 corresponds to transmitting means recited in a 2nd, 11th, 13th, 17th, or 19th aspect; step S200 corresponds to receiving means recited in a 2nd, 12th, 13th, 18th, or 19th aspect; and steps S202 and S204 correspond to match determining means recited in a 2nd, 5th, 11th, 13th, 17th, or 19th aspect.

Steps S206 and S208 correspond to reference-information changing means recited in a second aspect or reference-information obtaining means recited in a 5th, 11th, 13th, 17th, or 19th aspect. Step S212 corresponds to information restoring means recited in a 2nd, 12th, 13th, 18th, or 19th aspect.

In the 'second embodiment described above, each of the server terminal S and the client terminals $C_1$ to $C_3$ generates difference information from information to be transmitted, based on reference information held by itself, and transmits the generated difference information to an intended terminal.

Meanwhile, upon receiving difference information, each of server terminal S and the client terminals $C_1$ to $C_3$ determines whether or not reference information held by the transmission source of the difference information and reference information held by itself match with each other. Upon determining that they are not the same, each of the server terminal S and the client terminals $C_1$ to $C_3$ obtains reference information held by the transmission source of the difference information, and, based on the obtained reference information, restores, from the received difference information, information to be transmitted. However, the configuration thereof is not limited thereto, and the following configuration may also be employed.

Each of the server terminal S and the client terminals $C_1$ to $C_3$ determines whether or not reference information held by the transmission destination of difference information and reference information held by itself are the same. Upon determining that they are not the same, each of the server terminal S and the client terminals $C_1$ to $C_3$ obtains the reference information held by the transmission destination of the difference information, and, based on the obtained reference information, generates difference information from information to be transmitted and transmits the generated difference information to an intended terminal. Further, upon receiving difference information, based on information held by itself, each of server terminal S and the client terminals $C_1$ to $C_3$ restores, from the received difference information, the information to be transmitted.

In this case, each of the server terminal S and the client terminals $C_1$ to $C_3$ correspond to a first communication device recited in a 1st aspect; a second communication device recited in a 1st aspect; a transmitting device recited in a 2nd, 5th, 12th, 13th, 18th, or 19th aspect; or a receiving device recited in a 2nd, 5th, 11th, 13th, 17th, or 19th aspect. Steps S104 and S106 correspond to difference-information generating means recited in a 2nd, 5th, 11th, 13th, 17th, or 19th aspect; step S108 corresponds to transmitting means recited in a 2nd, 11th, 13th, 17th, or 19th aspect; and step 200 corresponds to receiving means recited in a 2nd, 12th, 13th, 18th, or 19th aspect.

Steps S202 and S204 correspond to match determining means recited in a 2nd, 5th, 11th, 13th, 17th, or 19th aspect; and steps 206 and S208 correspond to reference-information changing means recited in a 2nd aspect or reference-information obtaining means recited in a 5th, 11th, 13th, 17th, or 19th aspect. Further, step S212 corresponds to information restoring means recited in a 2nd, 12th, 13th, 18th, or 19th aspect.

In the first embodiment described above, while a case in which reference information is created in advance has been described, the present invention is not limited thereto. Thus, the portable terminals 100 to 120 may be configured to generate reference information such that the amount of data communicated during differential communication is reduced.

In this case, each of the portable terminals 100 to 120 corresponds to a transmitting device recited in a seventh aspect or a receiving device recited in a seventh aspect.

In the second embodiment, the configuration is such that the position coordinate of the server terminal S is used as the reference information; however, the present invention is not limited thereto. Thus, the server terminal S and the client terminals $C_1$ to $C_3$ may be configured to generate reference information such that the amount of data communicated during differential communication is reduced.

In this case, each of the server terminal S and the client terminals $C_1$ to $C_3$ corresponds to a transmitting device recited in a 7th aspect or a receiving device recited in a 7th aspect.

In the first and second embodiments, the configurations are such that reference information is transmitted or received as it is; however, the present invention is not limited thereto and thus the configuration may be such that reference information may be transmitted in an encrypted form.

This can improve confidentiality in the transmission and reception of reference information, thus allowing a further improvement in confidentiality of the entire communication.

Additionally, in the first and second embodiments, while differential communication has been used to communicate a profile or a position coordinate, differential communication may also be used, for example, to communicate business transaction information, personnel information, or system access/log-in information.

In addition, in the first and second embodiments, while the description has been given for a case in which a control program pre-stored in the ROM 32 is executed for execution of each process shown in the flow charts in FIGS. 7 to 9, the present invention is not limited thereto. Thus, the program instructing the procedures may be read for execution into the RAM 34 from a storage medium in which the program is stored.

The storage medium herein may be any storage medium that can be read on a computer, regardless of a reading method, such as an electronic, magnetic, or optical method. Examples include a semiconductor storage medium, such as a RAM or ROM; a magnetic-storage-type storage medium, such as an FD or HD; an optical-reading-system storage medium, such as a CD, CDV, LD, or DVD; or a magnetic-storage-type/optical-reading-system storage medium, such as an MO.

Additionally, in the first and second embodiments, while a differential communication system, a differential communication device, a differential communication program, and a differential communication method according to the present invention has been applied to a case in which differential communication is performed in a dynamically-configured wireless network, they are not limited thereto. Thus, they can also be applied to a case in which differential communication is performed in another network, such as the Internet or a LAN.

In the first embodiment, a differential communication system, a differential communication device, a differential communication program, and a differential communication system according to the present invention are applied, as shown in FIG. 1, to a case in which the plurality of portable terminals 100 to 120 dynamically configure a wireless network and perform differential communication over the wireless network, but are not limited thereto. Thus, they can also be applied to other cases without departing from the spirit and scope of the present invention.

In the second embodiment, a differential communication system, a differential communication device, a differential communication program, and a differential communication system according to the present invention are applied, as shown in FIG. 12, to a case in which the plurality of client terminals $C_1$ to $C_3$ dynamically configure a wireless network in conjunction with the server terminal S and the plurality of client terminals $C_1$ to $C_3$ perform differential communication with the server terminal S over the wireless network, but are not limited thereto. Thus, they can be applied to other cases without departing from the spirit and scope of the present invention.

[Advantages]

As described above, in a differential communication system recited in a first aspect of the present invention, when differential communication is performed, reference information used by a first communication device and reference information used by a second communication device become common. This provides an advantage in that differential communication can be performed between the first communication device and the second communication device even when the first communication device and the second communication device dynamically configure a network to perform communication.

In addition, in a differential communication system recited in 2nd to 6th aspects of the present invention, when differential communication is performed, reference information used by a transmitting device and reference information used by a receiving device become common. This can provide an advantage in that differential communication can be performed between the transmitting device and the receiving device even when the transmitting device and the receiving device dynamically configure a network to perform communication.

Additionally, in a differential communication system recited in a fourth aspect of the present invention, since reference information ID is added to difference information, a receiving device can realize, by only receiving the difference information, whether or not reference information used by a transmitting device and reference information used by the receiving device are the same. As a result, there is no need to have a process for inquiring a transmitting device to determine if there is a match, thus providing an advantage in that the communication procedures become relatively simple.

Furthermore, a differential communication system recited in a sixth aspect of the present invention can provide an advantage in that differential communication can be performed in a dynamically configured network.

In addition, in a differential communication system recited in a seventh aspect of the present invention, it can be expected that the amount of data communicated between a transmitting device and a receiving device is reduced, thus providing an advantage in that the amount of communication is reduced.

Meanwhile, a differential communication device recited in 8th to 10th aspects of the present invention can provide the same advantage as the differential communication system recited in a third embodiment.

In addition, a differential communication device recited in 11th to 13th aspects of the present invention can provide the same advantage as the differential communication system recited in a fifth aspect.

Meanwhile, a differential communication program recited in a fourteenth aspect of the present invention can provide the same advantage as the differential communication device recited in an eighth aspect.

Additionally, a differential communication program recited in a fifteenth aspect of the present invention can provide the same advantage as the differential communication device recited in a ninth aspect.

Furthermore, a differential communication program recited in a sixteenth aspect of the present invention can provide the same advantage as the differential communication device recited in a tenth aspect.

In addition, a differential communication program recited in a seventeenth aspect of the present invention can provide the same advantage as the differential communication device recited in an eleventh aspect.

Additionally, a differential communication program recited in an eighteenth aspect of the present invention can provide the same advantage as the differential communication device recited in a twelfth aspect.

Furthermore, a differential communication program recited in a nineteenth aspect of the present invention can provide the same advantage as the differential communication device recited in a thirteenth aspect.

Meanwhile, a differential communication method recited in twentieth aspect of the present invention can provide the same advantage as the differential communication system recited in a first aspect.

What is claimed is:

1. A differential communication system having a transmitting device and a receiving device that are connected to be able to communicate with each other and perform differential communication therebetween, comprising:
    a match determining device that determines whether or not reference information used by the transmitting device and reference information used by the receiving device are the same during differential communication; and
    a reference-information changing device that changes, based on a result determined by the match determining device, reference information in at least one of the transmitting device and the receiving device so that the reference information used by the transmitting device and reference information used by the receiving device become the same,
    the transmitting device including a difference-information generating device that generates, based on the reference information used by the transmitting device, difference information from information to be transmitted, and a transmitting component that transmits the difference information generated by the difference-information generating device to the receiving device, and
    the receiving device including receiving component that receives the difference information from the transmitting device, and an information restoring device that restores, from the difference information received by the receiving component, information to be transmitted, based on the reference information used by the receiving device.

2. A differential communication system according to claim 1, the receiving device including a match determining device that determines whether or not the reference information used by the receiving device and the reference information used by the transmitting device are the same, and a reference-information obtaining device that obtains when the match determining device determines that they are not the same, the reference information used by the transmitting device or information the same as the reference information, and
    based on the reference information obtained by the reference-information obtaining device, the information-restoring device restores, from the difference information received by the receiving component, the information to be transmitted.

3. A differential communication system according to claim 2, the difference-information generating device attaches reference information ID for identifying the reference information used by the transmitting device to the difference information, and
    the match determining device obtains the reference information ID from the difference information received by the receiving component and determines whether or not the reference information identified with the obtained reference information ID and the reference information used by the receiving vice are the same.

4. A differential communication device that performs differential communication with the receiving device in a differential communication system according to claim 2, further comprising:

a difference-information generating device that generates, based on reference information used by the differential communication device, the difference information from the information to be transmitted; and a transmitting component that transmits the difference information generated by the difference-information generating device to the receiving device.

5. A differential communication program that is executed by a differential communication device according to claim 4, the differential communication device being implemented by a computer, the program causing the computer to realize:

a difference-information generating device that generates, from the information to be transmitted, the difference information, based on the reference information used by the differential communication device; and a transmitting component that transmits the difference information generated by the difference-information generating device to the receiving device.

6. A differential communication device for performing differential communication with the transmitting device in a differential communication system according to claim 2, further comprising:

a receiving component that receives the difference information from the transmitting device;

a match determining device that determines whether or not reference information used by the differential communication device and the reference information used by the transmitting device are the same;

a reference-information obtaining device that obtains, when the match determining device determines that they are not the same, the reference information used by the transmitting device or information the same as the reference information; and an information restoring device that restores, from the difference information received by the receiving component, the information to be transmitted, based on the reference information obtained by the reference-information obtaining device.

7. A differential communication program executed by a differential communication device according to claim 6, the differential communication device being implemented by a computer, the program causing the computer to realize:

a receiving component that receives the difference information from the transmitting device;

a match determining device that determines whether or not the reference information used by the differential communication device and the reference information used by the transmitting device are the same;

a reference-information obtaining device that obtains, when the match determining device determines that they are not the same, the reference information used by the transmitting device or information the same as the reference information; and an information restoring component that restores, from the difference information received by the receiving device, the information to be transmitted, based on the reference information obtained by the reference-information obtaining device.

8. A differential communication device for performing differential communication with the transmitting device and the receiving device in a differential communication system according to claim 2, further comprising:

a difference-information generating device that generates, based on reference information used by the differential communication device, the difference information from the information to be transmitted;

a transmitting component that transmits the difference information generated by the difference-information generating device to the receiving device;

a receiving component that receives the difference information from the transmitting device;

a match determining device that determines whether or not the reference information used by the differential communication device and the reference information used by the transmitting device are the same;

a reference-information obtaining device that obtains, when the match-determining device determines that they are not the same, the reference information used by the transmitting device or information the same as the reference information; and an information restoring device that restores, from the difference information received by the receiving component, the information to be transmitted, based on the reference information obtained by the reference-information obtaining device.

9. A differential communication program executed by a differential communication device according to claim 8, the differential communication device being implemented by a computer, the program causing the computer to realize:

a difference-information generating device that generates, based on reference information used by the differential communication device, the difference information from the information to be transmitted;

a transmitting component that transmits the difference information generated by the difference-information generating device to the receiving device;

a receiving component that receives the difference information from the transmitting device;

a match determining device that determines whether or not the reference information used by the differential communication device and the reference information used by the transmitting device are the same;

a reference-information obtaining device that obtains, when the match-determining device determines that they are not the same, the reference information used by the transmitting device or information the same as the reference information; and an information restoring device that restores, from the difference information received by the receiving component, the information to be transmitted, based on the reference information obtained by the reference-information obtaining device.

10. A differential communication system according to claim 1, the transmitting device including a match determining device that determines whether or not the reference information used by the transmitting device and the reference information used by the receiving device are the same, and a reference-information obtaining device that obtains, when the match determining device determines that they are not the same, the reference information used by the transmitting device or information the same as the reference information, and based on the reference information obtained by the reference-information obtaining device, the difference-information generating device generates the difference information from the information to be transmitted.

11. A differential communication device for performing differential communication with the receiving device in a differential communication system according to claim 10, further comprising:

a match determining device that determines whether or not reference information used by the differential communication device and the reference information used by the receiving device are the same;

a reference-information obtaining device that obtains, when the match determining device determines that they are not the same, the reference information used by the receiving device or information the same as the reference information;

a difference-information generating device that generates, from the information to be transmitted, the difference information, based on the reference information obtained by the reference-information obtaining device; and a transmitting component that transmits the difference information generated by the difference-information generating device to the receiving device.

12. A differential communication program executed by a differential communication device according to claim 11, the differential communication device being implemented by a computer, the program causing the computer to realize:

a match determining device that determines whether or not the reference information used by the differential communication device and the reference information used by the receiving device are the same;

a reference-information obtaining device that obtains, when the match determining device determines that they are not the same, the reference information used by the receiving device or information the same as the reference information;

a difference-information generating device that generates the difference information from the information to be transmitted, based on the reference information obtained by the reference-information obtaining device; and a transmitting component that transmits the difference information generated by the difference-information generating device to the receiving device.

13. A differential communication device for performing differential communication with the transmitting device in a differential communication system according to claim 10, further comprising:

a receiving component that receives the difference information from the transmitting device; and an information restoring device that restores, from the difference information received by the receiving component, the information to be transmitted, based on reference information used by the differential communication device.

14. A differential communication program executed by a differential communication device according to claim 13, the differential communication device being implemented by a computer, the program causing the computer to realize:

a receiving component that receives the difference information from the transmitting device and information restoring device that restores, from the difference information received by the receiving component, the information to be transmitted, based on the reference information used by the differential communication device.

15. A differential communication device for performing differential communication with the transmitting device and the receiving device in a differential communication system according to claim 10, further comprising:

a match determining device that determines whether or not reference information used by the differential communication device and the reference information used by the receiving device are the same;

a reference-information obtaining device that obtains, when the match-determining device determines that they are not the same, the reference information used by the receiving device or information the same as the reference information;

a difference-information generating device that generates the difference information from the information to be transmitted, based on the reference information obtained by the reference-information obtaining device;

a transmitting component that transmits the difference information generated by the difference-information generating device to the receiving device;

a receiving component that receives difference information from the transmitting device; and an information restoring device that restores, from the difference information received by the receiving component, the information to be transmitted, based on the reference information used by the differential communication device.

16. A differential communication program executed by a differential communication device according to claim 15, the differential communication device being implemented by a computer, the program causing the computer to realize:

a match determining device that determines whether or not the reference information used by the differential communication device and the reference information used by the receiving device are the same;

a reference-information obtaining device that obtains, when the match determining device determines that they are not the same, the reference information used by the receiving device or information the same as the reference information;

a difference-information generating device that generates the difference information from the information to be transmitted, based on the reference information obtained by the reference information obtaining device;

a transmitting component that transmits the difference information generated by the difference-information generating device to the receiving device;

a receiving component that receives difference information from the transmitting device; and an information restoring device that restores, from the difference information received by the receiving component, the information to be transmitted, based on the reference information used by the differential communication device.

17. A differential communication system according to claim 1, the transmitting device and the receiving device being able to dynamically configure a network, and, when the transmitting device and the receiving device are allowed by the network to communicate with each other, they perform differential communication over the network.

18. A differential communication system according to claim 1, further comprising a reference-information generating device that generates the reference information so that the amount of data communicated between the transmitting device and the receiving device is reduced during differential communication.

* * * * *